United States Patent
May

(10) Patent No.: US 6,329,800 B1
(45) Date of Patent: Dec. 11, 2001

(54) METHOD AND APPARATUS FOR REDUCING POWER CONSUMPTION IN DRIVER CIRCUITS

(75) Inventor: Michael R. May, Austin, TX (US)

(73) Assignee: Sigmatel, Austin, TX (US)

( * ) Notice: Subject to any disclaimer, the term of this patent is extended or adjusted under 35 U.S.C. 154(b) by 0 days.

(21) Appl. No.: 09/690,501

(22) Filed: Oct. 17, 2000

(51) Int. Cl.[7] .................................................. G05F 1/40
(52) U.S. Cl. ............................................................ 323/283
(58) Field of Search .................................. 323/282, 283, 323/284, 285, 351

(56) References Cited

U.S. PATENT DOCUMENTS

| | | | |
|---|---|---|---|
| 4,482,985 | 11/1984 | Itoh et al. . | |
| 4,626,766 | * 12/1986 | Musil | 323/222 |
| 4,656,414 | * 4/1987 | Morud | 323/289 |
| 4,680,534 | * 7/1987 | Tanaka et al. | 323/290 |
| 5,028,861 | * 7/1991 | Pace et al. | 323/222 |
| 5,453,703 | 9/1995 | Goldfarb . | |
| 5,659,241 | * 8/1997 | Horiuchi et al. | 323/222 |
| 5,818,707 | * 10/1998 | Seong et al. | 363/89 |
| 5,942,882 | * 8/1999 | Ohta | 323/282 |
| 6,222,355 | * 4/2001 | Ohshima et al. | 232/282 |

* cited by examiner

*Primary Examiner*—Adolf Deneke Berhane
(74) *Attorney, Agent, or Firm*—Timothy W. Markison

(57) ABSTRACT

A method and apparatus for reducing power consumption in driver circuits includes processing that begins by receiving information pertaining to an input signal. Such information may be a digital information representation of the input signal, the input signal, a resulting drive signal, an amplifying setting signal, a volume setting, or magnitude information of the input signal. The processing continues by generating a control signal based on the information. The control signal is provided to a power supply that produces a controlled supply voltage that varies in accordance with the control signal. The controlled supply voltage is then provided to a driver circuit that amplifies the input signal to produce a drive signal.

23 Claims, 4 Drawing Sheets

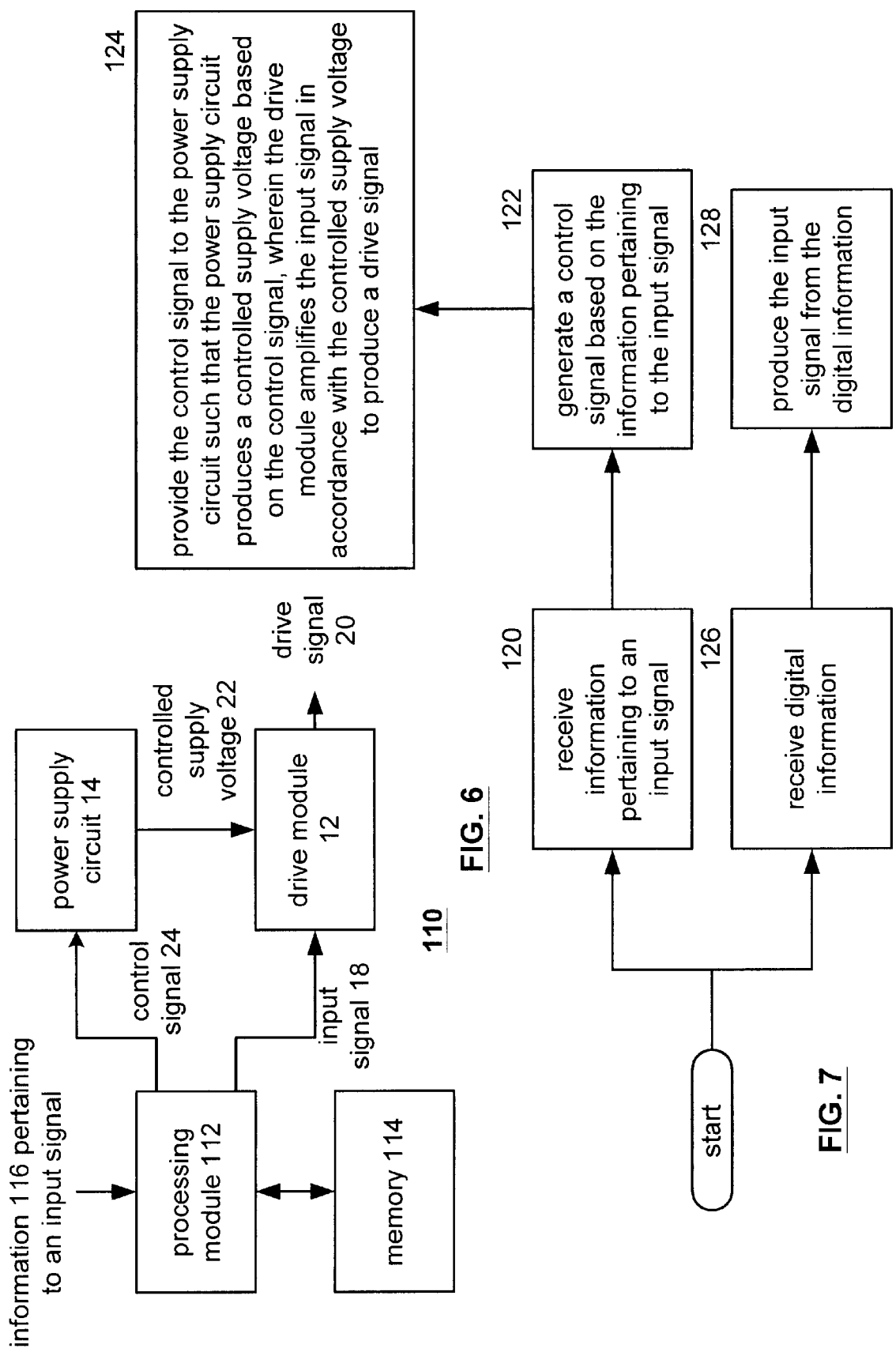

US 6,329,800 B1

METHOD AND APPARATUS FOR REDUCING POWER CONSUMPTION IN DRIVER CIRCUITS

TECHNICAL FIELD OF THE INVENTION

This invention relates generally to power supplies and more particularly to regulating a power supply voltage to reduce power consumption by drive circuits.

BACKGROUND OF THE INVENTION

Power supply circuits are known to produce a regulated output voltage or a plurality of regulated output voltages. A power supply may be implemented using one of a variety of different topologies. For example, a power supply may be implemented as a switch mode power supply utilizing a buck converter topology, a boost converter topology. a half bridge inverter topology, or a full bridge inverter topology. The particular topology used for a switch mode power supply typically depends on the output power requirements of the power supply. For instance, a power supply that produces lower power outputs will typically be implemented using a buck or boost converter while a power supply that produces higher power outputs will typically be implemented using a half bridge inverter or a full bridge inverter.

Such switch mode power supplies are regulated to produce a fixed output voltage(s), within specified tolerances, as the load varies. As such, regardless of the load, the output voltage(s) produced by a power supply remain constant.

A driver is known to receive a low power input signal and produce a high powered output signal. The driver may be used in audio applications to drive a headphone or speakers, it may be used in computer applications to drive data onto a bus, or in telecommunications applications to drive data onto telecommunication transmission mediums, such as fiber optics, twisted pair, Ethernet, et cetera. Such drivers are typically powered by an output of a power supply. As previously discussed, an output voltage of a power supply is a fixed regulated voltage.

As is known, power consumption of analog transistor circuitry, which is found within driver circuits, increases linearly with the source voltage. Thus, the higher the voltage. the more power is consumed by the circuitry. In most driver circuit applications. the input signals to the driver vary significantly over time such that the driver has a limited amount of time where it is required to operate at its maximum output voltage.

Thus, power consumption of a driver is often greater than it needs to be since the value of the fixed power supply is determined by maximum driver output voltage.

Therefore, a need exists for a method and apparatus that reduces power consumption in driver circuits by regulating the voltage powering the driver circuits.

BRIEF DESCRIPTION OF THE DRAWINGS

FIG. 6 illustrates a schematic block diagram of another alternate reduced power consuming driver circuit in accordance with the present invention; and FIG. 7 illustrates a logic diagram of a method for reducing power consumption in driver circuits in accordance with the present invention.

DETAILED DESCRIPTION OF THE PREFERRED EMBODIMENT

Generally, the present invention provides a method and apparatus for reducing power consumption in driver circuits. Such a method and apparatus includes processing that begins by receiving information pertaining to an input signal. Such information may be a digital information representation of the input signal, the input signal, a resulting drive signal. an amplifying setting signal, a volume setting, or magnitude information of the input signal. The processing continues by generating a control signal based on the information. The control signal is provided to a power supply that produces a controlled supply voltage that varies in accordance with the control signal. The controlled supply voltage is then provided to a driver circuit that amplifies the input signal to produce a drive signal, where amplifies includes amplifying the voltage of the input signal. amplifying the current of the input signal, and/or providing the input signal to low impedance loads with negligible adverse effects to the characteristics of the input signal. With such a method and apparatus power consumption by a driver circuit is optimized as a result of varying the supply voltage provided to the driver circuit based on the needs of the driver circuit to adequately produce the drive signal from the input signal. By optimizing power consumption of driver circuits, portable electronic devices that include such driver circuits can be more efficient thus offer extended battery life.

Figure 1:
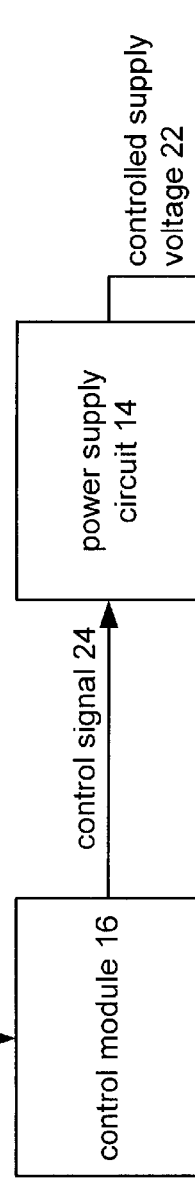
FIG. 1 illustrates a schematic block diagram of a reduced power consuming driver circuit in accordance with the present invention.

The present invention can be more fully described with reference to FIGS. 1 through 7. FIG. 1 illustrates a schematic block diagram of a reduced power consuming driver circuit 10 that includes a driver module 12, a power supply circuit 14, and a control module 16. The driver module 12 may be a line driver, amplifier, et cetera that receives an input signal 18 and produces there from a drive signal 20. The input signal 18 may be an analog signal or a digital signal while the drive signal 20 is a replication of the input signal with an increased voltage or an increased current. As one of average skill in the art will appreciate, the reduced power consuming driver circuit 10 may be used to drive a variety of different analog signals such as audio signals, telecommunication signals, et cetera and a variety of different digital signals such as memory read and/or writes. digital telecommunications, digital clock signals, et cetera.

The power supply circuit 14 of the reduced power consuming driver circuit 10 may be a switch mode power supply, a voltage regulator, or a DC-DC converter that produces 1 or more output voltages. One of the output voltages produced by the power supply circuit 14 is a controlled supply voltage 22. The power supply circuit 14 varies the controlled supply voltage 22 based on a control signal 24. The control signal is representative of the power needed to adequately produce the drive signal 20 from the input signal 18 in such a manner to optimize power consumption by the drive module 12.

The control module 16 is operably coupled to receive at least one property 26 of the input signal or the drive signal.

The at least one property may be the input signal itself a digital representation of the input signal an amplifying setting for the input signal (i.e., a voltage amplifying setting or a current amplifying setting), a volume setting for the input signal when the input signal is an audio signal, and/or the magnitude of the input signal either as an RMS value or a peak voltage value. Based on the at least one property 26, the control module 16 generates the control signal 24. Generally, the control module 16 is determining the magnitude of the input signal and, knowing the amplifying capabilities of the drive module 12, it generates the control signal 24 such that the power consumption by the drive module 12 is optimized. This concept can be illustrated graphically as shown in FIG. 2.

Figure 2:
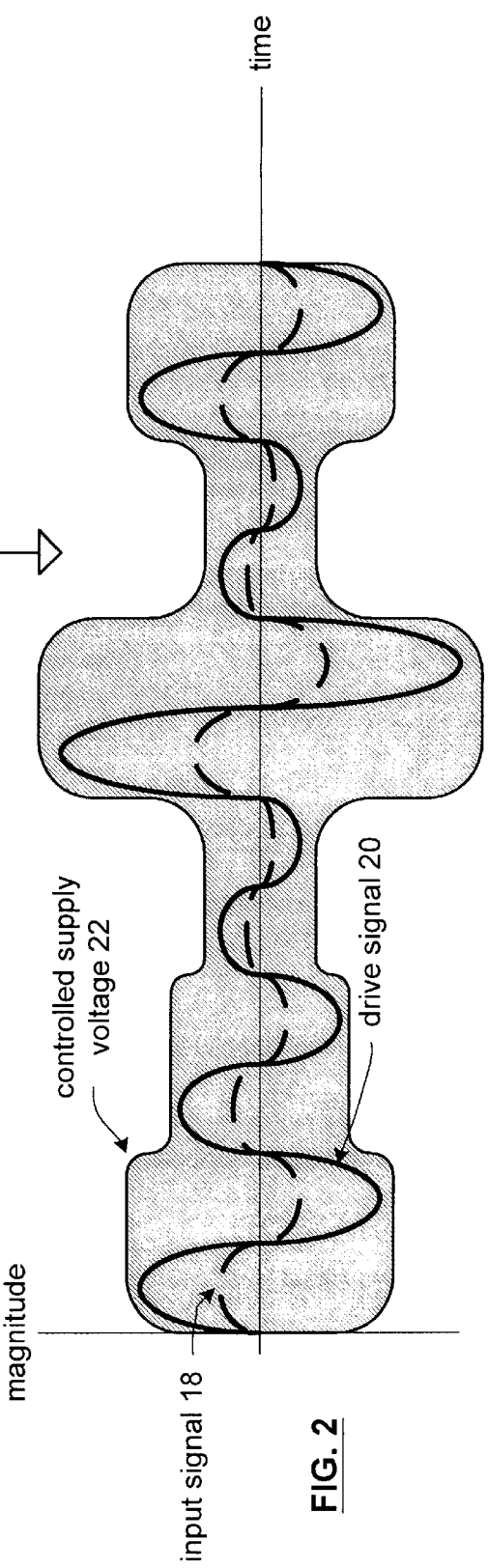
FIG. 2 illustrates a graphical representation of reducing power consumption in a driver circuit in accordance with the present invention.

FIG. 2 illustrates a graphical representation of the functionality of the reduced power consuming driver circuit 10 of FIG. 1. As shown, the input signal 18 is plotted on a graph that has time on its horizontal axis and magnitude on its vertical axis. Also shown is the drive signal 20, which is an amplified representation of the input signal 18. In this instance, the drive module 12 amplifies the voltage of the input signal by a factor of approximately 2.5. Based on the amplifying capabilities of the drive module 12, the control signal 24 is produced such that the controlled supply voltage 22 is of a sufficient value to adequately source the drive module 12 in producing the drive signal 20.

As shown, as the magnitude of the drive signal 20 changes, which corresponds to the magnitude of the input signal 18 changing, the controlled supply voltage 22 changes. When the magnitude of the input signal is small, the controlled supply voltage 22 is proportionally small. As the magnitude of the input signal 18 increases, the controlled supply voltage 22 correspondingly increases. As such, by providing the drive module 12 with a varying controlled supply voltage 22 based on the magnitude of the input signal 18, power consumption by the drive module 12 is optimized.

Figure 3:
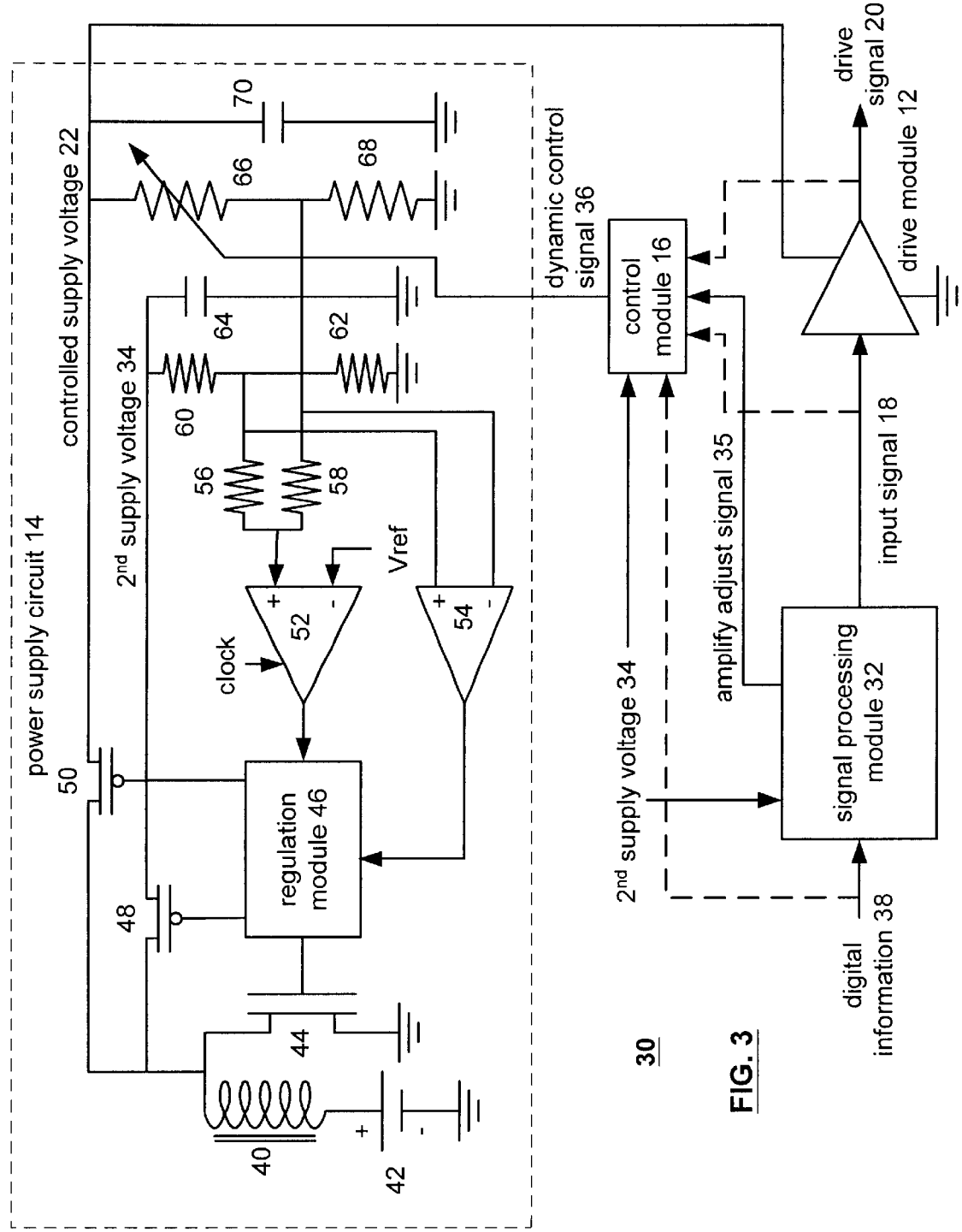
FIG. 3 illustrates a schematic block diagram of an alternate reduced power consuming driver circuit in accordance with the present invention.

FIG. 3 illustrates an alternate schematic block diagram of a reduced power consuming driver circuit 30 that includes a signal processing module 32, the drive module 12, the control module 16 and the power supply circuit 14. The signal processing module 32, which may be a digital signal processor. microprocessor, central processing unit, state machine or logic circuitry, receives digital information 38. The digital information 38 may be a digital representation of the input signal, amplifying settings for the input signal and/or a supply voltage setting. For instance, the supply voltage setting may be an input indicating the value of the controlled supply voltage 22, where the supply voltage setting is determined by the processing circuitry producing the digital information such as a central processing unit, a digital signal processor, or a microprocessor.

The signal processing module 32 produces the input signal 18 and may also optionally produce an amplify adjust signal 35. The amplify adjust signal 35 may be determined from the digital information 38 and is one of multiple options for providing an input to the control module 16. The amplify adjust signal 35 may be representative of a volume setting which is derived from the digital information, or an amplification setting, et cetera. The input signal 18 is provided to the drive module 12, which produces the drive signal 20.

The control module 16 generates a dynamic control signal 36 from at least one of its optional inputs. As mentioned one of the optional inputs is the amplify adjust signal 35, while the other optional inputs include a portion of the digital information 38, the input signal 18 and the drive signal 20. Depending on the particular embodiment of the control module 16 (refer to FIGS. 4 and 5 for a discussion on various embodiments) any one of these or all of these inputs may be utilized to generate the dynamic control signal 36.

The power supply circuit 14 is shown as a boost converter that produces two output voltages: the controlled supply voltage 22 and a $2^{nd}$ supply voltage 34. The $2^{nd}$ supply voltage 34 may be used to separately power the control module 16 and the signal processing module 32. The controlled supply voltage 22 is used to power the drive module 12. Alternatively, only the controlled supply voltage 22 may be produced by the power supply circuit 14 and would be used to power all of the elements of the reduced power consuming drive circuit 30.

The power supply circuit 14 includes an inductor 40, a power source 42, an N-channel transistor 44, two P-channel transistors 48 and 50, a regulation module 46, two comparators 52, 54, a resistive divider network for both outputs 56, 58, 60, 62, 66 and 68, and two capacitors 64 and 70. The resistive network including resistors 60 and 62 is used to produce a representative voltage of the $2^{nd}$ supply voltage 34 while resistive network including resistors 66 and 68 is used to provide a representative voltage of the controlled supply voltage 22. Power supply circuit 14 receives the dynamic control signal 36, which causes resistor 66 to correspondingly vary its resistance value. By changing the value of resistor 66, the representative voltage of the controlled supply voltage 22 changes thus causing the controlled supply voltage 22 to change. In essence, the feedback loop controlling the controlled supply voltage 22 is adjusted. A more detailed discussion of the operation of power supply circuit 14 may be found in a co-pending application Ser. No. of 09/551,123, entitled METHOD AND APPARATUS FOR REGULATING A DC VOLTAGE, having a filing date of Apr. 18, 2000.

Figure 4:
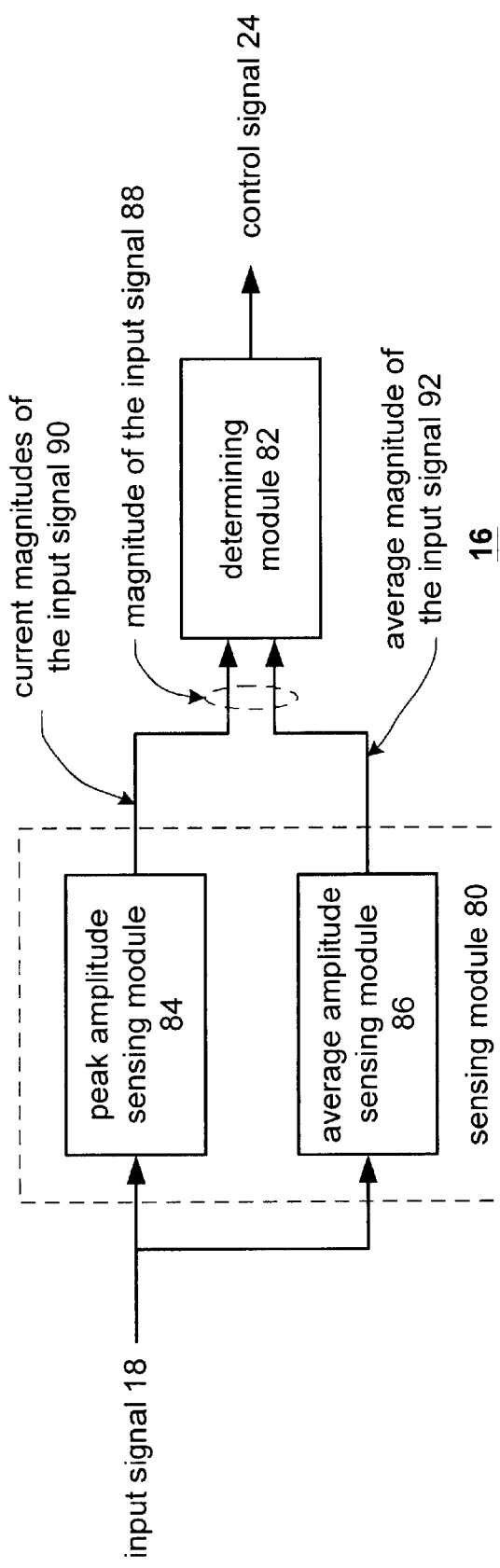
FIG. 4 illustrates a schematic block diagram of the control module of the reduced power consuming driver circuit of FIG. 1 or FIG. 3.

FIG. 4 illustrates a schematic block diagram of the control module 16 that includes a sensing module 80 and a determining module 82. The sensing module 80 includes a peak amplitude sensing module 84 and an average amplitude sensing module 86. The input signal 18 is received by the peak amplitude sensing module 84 and the average amplitude sensing module 86. The peak amplitude sensing module 84 may be a comparator and operational amplifier coupled to detect the current magnitudes of the input signal 90. Alternatively, if the input signal 18 is in digital form, the peak amplitude sensing module 84 could be a digital signal processor programmed to detect the current magnitudes 90 of the input signal. The average amplitude sensing module may an integrator coupled to a comparator that detects the average magnitude 92 of the input signal. Alternatively, if the input signal 18 is in digital form, the average amplitude sensing module 80 could be a digital signal processor programmed to detect the average magnitude 92 of the input signal. Further, the average sensing module 86 could be reconfigured to sense rms values of the input signal 18. As one of average skill in the art will appreciate, the sensing module 80 could be designed to measure an arbitrary metric of the input signal 18.

The combination of the current magnitudes 90 of the input signal and the average magnitude 92 of the input signal constitutes the magnitude of the input signal 88. The determining module 82 receives the magnitude of the input signal 88 to produce the control signal 24. The determining module 82 may be a portion of a digital signal processor programmed to determine the amount of drive (e.g., increase in voltage or current) to be imposed on the input signal 18 based on the drive module and the power supply capabilities. Based on these inputs, the determining module 82 generates the control signal 24.

Figure 5:
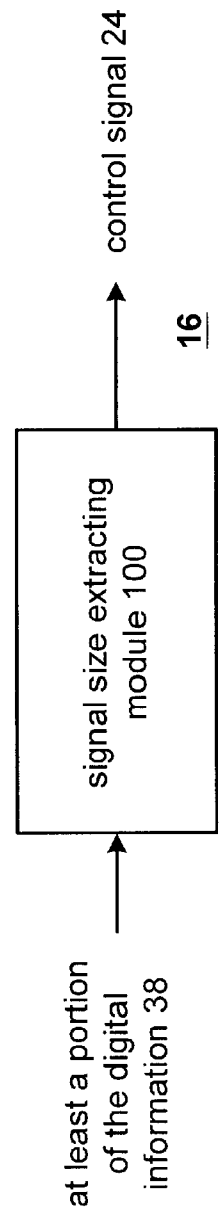
FIG. 5 illustrates an alternate schematic block diagram of the control module of the reduced power consuming driver circuit of FIG. 1 or FIG. 3.

FIG. 5 illustrates an alternate schematic block diagram of the control module 16 to include a signal size extracting module 100. The signal size extracting module 100 may be implemented in a digital signal processor and is programmed to extract the magnitude of the input signal from at least a portion of the digital information 38. Based on the magnitude of the input signal as determined from the digital information, the drive capabilities of the drive module 12 and the power supply capabilities of power supply circuit 14, the signal size extracting module 100 generates the control signal 24.

FIG. 6 illustrates a schematic block diagram of a reduced power consuming drive circuit 110. The reduced power consuming drive circuit 110 includes a processing module 112, memory 114, the power supply circuit 14 and the drive module 12. The processing module 112 may be a single processing device or a plurality of processing devices. Such a processing device may be a digital signal processor, microcontroller, microcomputer, microprocessor, central processing unit, state machine, logic circuitry, and/or any device that manipulates signals (analog or digital) based on operational instructions. The memory 114 may be a single memory device or a plurality of memory devices. Such a memory device may be read only memory, random access memory, system memory, flash memory, and/or any device that stores digital information. Note that when the processing module implements one or more of its functions via a state machine or logic circuitry, the memory storing the corresponding operational instructions is embedded within the circuitry comprising the state machine or logic circuitry.

In operation, the processing module 112 receives information 116 pertaining to the input signal. The information 116 may be at least a portion of digital information regarding the input signal, the drive signal, a digital representation of the input signal, an amplifying setting for the input signal, i.e. the amount of amplification to be provided by the drive module 12, a volume setting for the input signal when the input signal is an audio signal, and/or the magnitude of the input signal. Based on this input, the processing module 112 generates the control signal 24 and the input signal 18. The control signal 24 is provided to the power supply circuit 14 which produces a controlled supply voltage 22. Powered by the controlled supply voltage 22, the drive module 12 produces a drive signal 20 from the input signal 18. The processing steps used by processing module 112 to generate the control signal 24 and the input signal 18 are illustrated in FIG. 7.

FIG. 7 illustrates a logic diagram of a method for producing power consumption in a drive circuit. The process reforms in parallel Steps 126 and 128, and 120 through 124. At Step 126, digital information is received. The digital information includes information pertaining to an input signal. The process then proceeds to Step 128 where the input signal is produced from the digital information. The input signal may be an audio input signal, an analog input signal for telecommunications, a digital signal for telecommunications, or digital information used in a computer system.

At Step 120, the information pertaining to the input signal is received. The process then proceeds to Step 122 where a control signal is generated based on the information pertaining to the input signal and possibly the drive capabilities of the drive module (e.g., the amount of amplification, transistor configuration, etc.). The process then proceeds to Step 124 where the control signal is provided to a power supply circuit such that the power supply circuit produces a controlled supply voltage based on the control signal. The controlled supply voltage powers a drive module that amplifies the input signal in accordance with the controlled supply voltage to produce the drive signal.

The preceding discussion has presented a method and apparatus for reducing power consumption in drive circuits. By providing a controlled voltage to a drive circuit that varies based on the amount of power needed by the drive circuit to produce an accurate drive signal, the power consumption of the drive circuit is optimized. By optimizing power consumption of drive circuits used in in portable electronic devices, the overall efficiency of the portable device is increased. Accordingly, battery life of such portable electronic devices is increased. As one of average skill in the art will appreciate. other embodiments may be derived from the teachings of the present invention without deviating from the scope of the claims.

What is claimed is:

1. A reduced power consuming driver circuit comprises:
    drive module operably coupled to receive an input signal, wherein the drive module amplifies power of the input signal to produce a drive signal;
    power supply circuit operably coupled to receive a control signal, wherein the power supply circuit generates a controlled supply voltage based on a control signal, and wherein the power supply circuit supplies the controlled supply voltage to the driver module; and
    control module operably coupled to receive at least one property of at least one of: the input signal and the drive signal, wherein the control signal generates the control signal based on the at least one property such that the controlled supply voltage is sized to optimize power consumption by the drive module.

2. The reduced power consuming drive circuit of claim 1, wherein the at least one property comprises at least one of: the input signal, a digital representation of the input signal, an amplifying setting for the input signal, a volume setting for the input signal when the input signal is an audio signal, and magnitude of the input signal.

3. The reduced power consuming drive circuit of claim 1 further comprises a signal processing module operably coupled to process digital information to produce the input signal and the at least one property, wherein the control module dynamically generates the control signal in accordance with the processing of the input signal to dynamic adjust the controlled supply voltage.

4. The reduced power consuming drive circuit of claim 1, wherein the power supply circuit comprises at least one of: a DC-DC converter and a voltage regulator.

5. The reduced power consuming drive circuit of claim 4, wherein when the power supply circuit comprises the DC-DC converter, the DC-DC converter receives the control signal and, in accordance with the control signal, adjusts a feedback loop in the DC-DC converter.

6. The reduced power consuming drive circuit of claim 4, wherein, when the power supply circuit comprises the DC-DC converter, the DC-DC converter generates the controlled supply voltage for the drive module and a separate supply voltage for other elements of the reduced power consuming drive circuit.

7. A reduced power consuming drive circuit comprises:
    signal processing module operably coupled to receive digital information and to produce an input signal from the digital information and a control signal;
    drive module operably coupled to receive an input signal, wherein the drive module amplifies power of the input signal to produce a drive signal;

power supply circuit operably coupled to receive a control signal, wherein the power supply circuit supplies a controlled supply voltage to the driver module, wherein the power supply circuit generates the controlled supply voltage based on the control signal such that the controlled supply voltage is sized to optimize power consumption by the drive module; and control module operably coupled to the signal processing module, wherein the control module generates the control signal based on at least one of: at least a portion of the digital information and the input signal.

8. The reduced power consuming drive circuit of claim 7, wherein the control module further comprises:

sensing module operably coupled to receive the input signal and to determine magnitude of the input signal; and determining module operably coupled to receive the magnitude of the input signal and to determine the control signal based on the magnitude of the input signal.

9. The reduced power consuming drive circuit of claim 8, wherein the sensing module further comprises:

peak amplitude sensing module operably coupled to detect current magnitudes of the input signal; and average amplitude sensing module operably coupled to determine an average magnitude of the input signal for a given time frame, wherein the magnitude of the input signal includes the current magnitudes and the average magnitude.

10. The reduced power consuming drive circuit of claim 7, wherein the control module further comprises:

signal size extracting module operably coupled to receive the at least a portion of the digital information and to determine therefrom the control signal.

11. The reduced power consuming drive circuit of claim 7, wherein the digital information comprises at least one of: a digital representation of the input signal, amplifying settings for the input signal, and a supply voltage setting.

12. The reduced power consuming drive circuit of claim 7, wherein the power supply circuit comprises at least one of: a DC-DC converter and a voltage regulator.

13. The reduced power consuming drive circuit of claim 12, wherein, when the power supply circuit comprises the DC-DC converter, the DC-DC converter receives the control signal and, in accordance with the control signal, adjusts a feedback loop in the DC-DC converter.

14. A method for reducing power consumption of a driver circuit, the method comprises the steps of:

receiving information pertaining to an input signal;

generating a control signal based on the information pertaining to the input signal;

controlling a supply voltage based on the control signal to produce a controlled supply voltage; and amplifying the input signal in accordance with the controlled supply voltage to produce a drive signal such that power consumption in producing the drive signal is optimized.

15. The method of claim 14 further comprises:

receiving digital information; and producing the input signal from the digital information.

16. The method of claim 15, wherein the information pertaining to the input signal further comprises: at least one of: at least a portion of the digital information the input signal, the drive signal, a digital representation of the input signal, an amplifying setting for the input signal, a volume setting for the input signal when the input signal is an audio signal, and magnitude of the input signal.

17. The method of claim 14, wherein the controlling a supply voltage further comprises adjusting, in accordance with the control signal, a feedback loop in a DC-DC converter.

18. A reduced power consuming drive circuit comprises:

drive module;

power supply circuit;

processing module; and memory operably coupled to the processing module, wherein the memory includes operational instructions that cause the processing module to:

receive information pertaining to an input signal;

generate a control signal based on the information pertaining to the input signal; and provide the control signal to the power supply circuit such that the power supply circuit produces a controlled supply voltage based on the control signal;

wherein the drive module amplifies the input signal in accordance with the controlled supply voltage to produce a drive signal such that power consumption in producing the drive signal is optimized.

19. The reduced power consuming drive circuit of claim 18, wherein the memory further comprises operational instructions that cause the processing module to:

receive digital information; and produce the input signal from the digital information.

20. The reduced power consuming drive circuit of claim 18, wherein the information pertaining to the input signal further comprises: at least one of: at least a portion of the digital information, the input signal, the drive signal, a digital representation of the input signal, an amplifying setting for the input signal, a volume setting for the input signal when the input signal is an audio signal, and magnitude of the input signal.

21. The reduced power consuming drive circuit of claim 18, wherein the power supply circuit comprises at least one of: a DC-DC converter and a voltage regulator.

22. The reduced power consuming drive circuit of claim 21, wherein, when the power supply circuit comprises the DC-DC converter, the DC-DC converter receives the control signal and, in accordance with the control signal, adjusts a feedback loop in the DC-DC converter.

23. The reduced power consuming drive circuit of claim 21, wherein, when the power supply circuit comprises the DC-DC converter, the DC-DC converter generates the controlled supply voltage for the drive module and a separate supply voltage for other elements of the reduced power consuming drive circuit.

* * * * *